United States Patent
Bader et al.

(10) Patent No.: US 7,624,618 B2
(45) Date of Patent: Dec. 1, 2009

(54) DEVICE WITH A SCREW PLUG AND A RANGE OF DEVICES

(75) Inventors: Antonius Bader, Bruchsal (DE); Matthias Mueller, Rastatt (DE); Heinrich Bolz, Karlsdorf-Neuthard (DE); Heinrich Zimmermann, Bruchsal (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 757 days.

(21) Appl. No.: 10/487,688

(22) PCT Filed: Jul. 9, 2002

(86) PCT No.: PCT/EP02/07602

§ 371 (c)(1),
(2), (4) Date: Feb. 24, 2004

(87) PCT Pub. No.: WO03/023200

PCT Pub. Date: Mar. 20, 2003

(65) Prior Publication Data

US 2004/0208725 A1    Oct. 21, 2004

(30) Foreign Application Priority Data

Aug. 24, 2001   (DE) ............................. 101 40 678

(51) Int. Cl.
*G01L 23/22* (2006.01)
(52) U.S. Cl. .............. 73/35.09; 73/35.01; 73/35.12; 73/35.13; 73/652; 116/104; 411/382

(58) Field of Classification Search ............... 73/35.01, 73/35.07, 35.09, 35.11–35.13, 649, 652, 73/866.5; 16/404; 411/190, 378, 381, 382, 411/395; 116/404
See application file for complete search history.

(56) References Cited

U.S. PATENT DOCUMENTS

| | | | | |
|---|---|---|---|---|
| 2,250,496 A | * | 7/1941 | Postlethwaite | 310/338 |
| 2,420,177 A | * | 5/1947 | Krall | 200/61.09 |
| 2,609,638 A | * | 9/1952 | Lindenmeyer | 446/126 |

(Continued)

FOREIGN PATENT DOCUMENTS

AT         363 791         8/1981

(Continued)

OTHER PUBLICATIONS

"Self Sealing Fasteners", APM Hexseal Catalog, Apr. 2000, pp. 1-9, available on the Internet at <www.apmhexseal.com/selfseal/catalog_pdfs/apm_sf-200.pdf>.*

*Primary Examiner*—David A. Rogers
(74) *Attorney, Agent, or Firm*—Kenyon & Kenyon LLP (57) ABSTRACT

A device having at least one screw plug for screwing into a first tapped hole of a housing or housing part of the device, the at least one screw plug including a device for sealing, such as a sealing ring, for the connection to the housing in a manner forming a seal, e.g., against the escape of oil. Introduced into the screw plug is a second tapped hole by which a sensor is releasably connectable, e.g., is able to be screwed in. The screw plug includes an end stop for conducting acoustical waves and for the simultaneous mechanical limit for screwing in the screw plug.

27 Claims, 4 Drawing Sheets

U.S. PATENT DOCUMENTS

| | | | | |
|---|---|---|---|---|
| 2,917,642 | A | * | 12/1959 | Wright et. al. ............... 310/338 |
| 3,869,391 | A | * | 3/1975 | Kramer ....................... 210/222 |
| 4,030,028 | A | * | 6/1977 | Allender ..................... 324/698 |
| 4,127,788 | A | * | 11/1978 | Daugherty .................. 310/328 |
| 4,202,311 | A | * | 5/1980 | Moriyoshi ............... 123/195 C |
| 4,257,369 | A | * | 3/1981 | Abe et al. ................. 123/198 E |
| 4,304,132 | A | * | 12/1981 | Snaper ..................... 73/304 R |
| 4,408,479 | A | * | 10/1983 | Asai et al. .................. 73/35.13 |
| 4,410,885 | A | * | 10/1983 | Stenstrom ................... 340/604 |
| 4,630,490 | A | * | 12/1986 | Malicki ................. 73/862.629 |
| 4,660,410 | A | * | 4/1987 | Asano et al. ............... 73/35.11 |
| 4,741,204 | A | * | 5/1988 | Luck et al. .................... 73/116 |
| 4,791,374 | A | * | 12/1988 | Yodice et al. ............... 324/439 |
| 4,823,606 | A | * | 4/1989 | Malicki ....................... 73/761 |
| 4,878,019 | A | * | 10/1989 | Tsaprazis et al. ............ 324/204 |
| 4,934,742 | A | * | 6/1990 | Williamson ................. 285/212 |
| 5,089,780 | A | * | 2/1992 | Megerle ..................... 324/448 |
| 5,142,914 | A | * | 9/1992 | Kusakabe et al. ............. 73/723 |
| 5,188,495 | A | | 2/1993 | Jones, Jr. |
| 5,435,170 | A | * | 7/1995 | Voelker et al. ............. 73/53.05 |
| 5,547,323 | A | * | 8/1996 | Fang .......................... 411/178 |
| 5,749,788 | A | * | 5/1998 | Bourque ....................... 473/44 |
| 5,960,772 | A | * | 10/1999 | Tracy et al. .............. 123/406.4 |
| 6,035,702 | A | * | 3/2000 | Graham ...................... 73/49.8 |
| 6,298,721 | B1 | * | 10/2001 | Schuppe et al. ................ 73/299 |
| 6,324,899 | B1 | * | 12/2001 | Discenzo ................... 73/53.05 |
| 6,499,488 | B1 | * | 12/2002 | Hunter et al. ............... 128/899 |
| 6,546,814 | B1 | * | 4/2003 | Choe et al. ............... 73/862.08 |
| 6,834,545 | B2 | * | 12/2004 | Jang ........................ 73/290 R |
| 6,964,518 | B1 | * | 11/2005 | Jagtoyen ..................... 374/154 |

FOREIGN PATENT DOCUMENTS

| | | | |
|---|---|---|---|
| AT | 363791 B | * | 8/1981 |
| DE | 198 42 173 | | 3/2000 |
| DE | 100 44 474 | | 10/2001 |
| EP | 0 557 688 | | 9/1993 |

* cited by examiner

Fig. 4

DEVICE WITH A SCREW PLUG AND A RANGE OF DEVICES

FIELD OF THE INVENTION

The present invention relates to a device and a production series of devices.

BACKGROUND INFORMATION

Industrial gear units are generally conventional which include lubricant that must be poured in or removed and exchanged during assembly and/or servicing. Therefore, many gear units have a tapped hole in their housing which is closed by a screw plug. To save space, this is provided with a hexagonal recess so that it does not protrude at all or protrudes as little as possible from the housing.

German Published Patent Application No. 198 42 173 describes a fastening element having a self-locating screw connection. A vibration sensor is able to be mounted on the fastening element.

A disadvantage in that case is that it is not possible to screw in the vibration sensor, since the fastening element has a bore hole starting from the base (FIG. 1 of German Published Patent Application No. 198 42 173, reference numeral 32) for improving the elasticity of the fastening element (German Published Patent Application No. 198 42 173, column 3, lines 41-45). The vibration sensor is thus pasted on or the like. Therefore, the structure-borne noise to be detected must be transmitted through the screw thread and the core (German Published Patent Application No. 198 42 173, reference numeral 22) and the adhesive connection. Consequently, only a single essential path exists for the sound, and it is not possible to achieve a good signal-to-noise ratio, since each junction, i.e., each connecting point, worsens the signal-to-noise ratio. It is also disadvantageous that when screwing in the fastening element, shavings develop which trigger oil contamination and later, even destruction of a device. In addition, because of the conical design, the axial guidance during the screw-in operation is poor. Therefore, the fastening element is at an unpredictable angle, and signal-to-noise ratios of different quality come about for the sensor signals depending on the angle. In the same manner, there is no defined stop face, and therefore also no defined pressure. As a result, the sealing function is also not defined, and the signal-to-noise ratios fluctuate for the same reasons, as well. There is also no reuse capability, since each time the fastening element is loosened and screwed in again, it sits ever more loosely in the base. Moreover, there is even the danger that if the tightening torque is too great, the O-ring (German Published Patent Application No. 198 42 173, reference numeral 4) will be destroyed, and therefore the sealing function can no longer be reliably ensured. In addition, the surface of the base and of the hexagon head is not machined, and already for this reason, a sealing function cannot be ensured.

It is an aspect of the present invention to provide as compact and cost-effective a production series of gear units as possible, in which gear units having vibration sensors may be also included, and which may provide great flexibility for meeting customer wishes.

SUMMARY

In accordance with an example embodiment of the present invention, the foregoing aspect with respect to the device may be achieved according to the features described herein, and with respect to the production series of devices, may be achieved according to the features described herein.

Features of an example embodiment of the present invention with respect to the device may include that the screw plug is connectable to the housing in a manner forming a seal, e.g., against the escape of oil, and that a second tapped hole, by which a sensor is able to be releasably connected, is introduced into the screw plug.

A compact and cost-effective production series of devices may therefore be possible which also includes gear units without or with vibration sensors, and may which may offer great flexibility in fulfilling customer wishes. If the customer only wants a device, for example, a gear unit or a geared motor, without vibration sensor, the device may be delivered with a screw plug, which may be either designed conventionally or according to an example embodiment of the present invention. However, if the customer wants a device having vibration sensors, the sensor is screwed into the screw plug. Thus, even sold and delivered devices may be modified or retrofitted quickly and easily, or may temporarily be equipped with the vibration sensors for analyses. A further aspect may be that no additional surface of the housing may need to be machined for mounting sensors. Therefore, machining processes may be reduced.

Moreover, different kinds of sensors may be used as the sensor. However, an example embodiment of the present invention may provide advantages in the case of vibration sensors, since they may be able to be connected imperviously, with high contact pressure and as directly as possible to the sound source. The use of tapped holes, e.g., may permit good coupling from a standpoint of acoustical engineering. Since the tightening torque may be designed to be different for the first and the second tapped hole, use of a suitably high tightening torque may offer a great degree of selectability for the coupling of the vibration sensor to the housing in terms of acoustical engineering. On the other hand, the sensor itself may be connectable with its stipulated tightening torque to the second tapped hole, and may thus not be destroyed or unacceptably stressed. Therefore, there may be great variance within the production series, accompanied by good coupling from the standpoint of acoustical engineering as a shared feature.

In an example embodiment, in the screwed-in state, the screw plug projects in such a manner from the housing with an external form protruding such that it is releasable or connectable again with a tool that is releasably connectable with form locking. The external form may be an external hexagon. A greater tightening torque may be applied than with an internal hexagon. In addition, the sensor and the screw plug may each be connectable separately.

In an example embodiment, the second tapped hole is introduced with sinking into the screw plug for the releasable connection to a sensor that has an external thread corresponding to the second tapped hole and a cone section corresponding to the sinking. This may provide that a mechanically stable connection may be produced which is good from the standpoint of acoustical engineering, thus, with low damping. The screw plug may further be able to be made of metal, and thus a high tightening torque may be applied, which means the sound damping at the second tapped hole with sinking may be reduced. In spite of the fact that the screw plug is made of metal, the connection of the screw plug toward the housing may be provided in an impervious manner using a sealing ring. In an example embodiment, the sensor may be a vibration sensor and/or a sensor for detecting acoustic vibrations at least in a subrange of the frequency range from 0 Hz to 10 MHz. Low frequencies may be detectable, for example, using a so-called knock sensor. Mid and/or high frequencies may be detectable using a sensor for sound or structure-borne noise, thus vibrations into the high ultrasonic range.

In an example embodiment, the screw plug may include an end stop for conducting acoustical waves and at the same time for a mechanical limit for the screw-in operation. With the aid of the end stop, a substantial portion of the sound transmission may be able to be realized in response to the application of a suitably high force. The end stop is pressed directly onto the sealing surface allocated to it and exhibiting a high surface quality. Thus, only low damping exists, even at mid or high frequencies. In addition, because of the well-defined form of the end stop and the well-defined contact pressure of the screw plug, an equally defined signal-to-noise ratio may be attainable.

In an example embodiment, the screw plug is may be contact with a sealing surface of the housing, the sealing surface having a surface quality such that an impervious connection may be able to be produced between the screw plug and the housing with the aid of the sealing ring. The screw plug may perform the sound-conducting function and the sealing function simultaneously. Thus, no further structural elements or a separate assembly such as a tapped hole in the housing and a separate screw plug may be necessary.

In an example embodiment, the housing is the housing of a gear unit including a lubricant, e.g., oil. This may provide that gear noises are able to be monitored. Thus, e.g., tooth breakage, pitting and/or overload impacts may be determined.

In an example embodiment, the housing of the gear unit may have a tapped hole straight through for removing and/or pouring in lubricant. This may provide that the screw plug is usable as a sealing, releasably connectable oil drain plug, and at the same time is usable as a conductor for sound. It may even make two propagation paths available for the sound, e.g., via the screw thread on one hand, and via the end stop on the other hand.

In an example embodiment, the screw plug may have a cylindrical external thread for screwing into the tapped hole. This may provide that an oblique position of the screw plug may be avoidable, and therefore a well-defined contact pressure, an equally defined sound transmission and an impervious seal at the entire periphery of the sealing surfaces may be able to be produced.

In an example embodiment, mutually contacting surfaces, the tightening torque of the sensor against the screw plug and the tightening torque of the screw plug against the housing may be such that acoustical vibrations are transmittable both by the first and second tapped hole and via the end stop with a sufficiently good signal-to-noise ratio for the detection by sensor. In this context, it may be provided that the sensor indeed has more than one connection—thus the connection of its external thread and its cone to the second tapped hole with sinking—toward the housing, e.g., the end stop and the external thread of the screw plug, but nevertheless, very good sound transmission, thus low damping, may be achievable.

In an example embodiment, the screw plug and the housing may be made of a metallic material. This may make it possible to provide a much higher tightening torque than for a plastic implementation, a seal of a high protection class, and at the same time, good sound transmission. Implementation in plastic, on the other hand, may lead to a much poorer signal-to-noise ratio.

Aspects with respect to the screw plug are thus, e.g., that the seal may only be able to be compressed to a specified degree, since the screw plug may only be able to be screwed in up to the end stop. Therefore, a well-defined sealing function of the same kind may always be able to be ensured, and the seal may be protected from destruction. In addition, a sealing surface, thus a machined surface, which therefore may ensure the predetermined sealing function, may be provided on the housing. Due to the cylindrical design of the screw thread of the screw plug, the axial guidance may be sufficient, that the screw plug is not askew in the housing. In addition, with the aid of the end stop, a defined surface may be able to be provided, resulting in a defined pressure, because the screw plug may only be able to be screwed in up to the end stop. Therefore, a well-defined signal-to-noise ratio may also be attainable.

Moreover, the screw plug may be able to be released and screwed in again without substantial loosening, etc. occurring. In addition, when screwing in, no shavings may be formed which may lead to contamination or destruction.

After the screw-in operation, the end stop may also form a protection for the sealing ring against the surroundings.

In an example embodiment, sealing ring 4 may be provided in such a manner that it is able to be increasingly compressed during the screw-in operation up to a maximum value determined by the end stop. Sealing ring 4 may be able to be positioned between two sealing surfaces (3, 7) whose direction of surface normal is parallel with respect to the axial direction of the screw plug thread, and during the screw-in operation, the distance between these sealing surfaces (3, 7) is able to be reduced up to a value determined by end stop 5. The sealing ring may be loaded as little as possible. During the screw-in operation, it may be increasingly compressed only between the sealing surfaces, and may not be pulled along and/or squeezed against the inner wall of the first tapped hole.

Aspects with respect to the production series of devices are that the production series includes at least two sizes which include different screw plugs, and the same sensor may be connectable to these different screw plugs for the at least two sizes. This may provide that the production series may feature a wide variety for satisfying customer wishes, and may be extremely inexpensive, compact and able to be manufactured quickly and easily.

In an example embodiment, the sensor may be releasably connectable with its external thread to the tapped hole of the screw plug. All screw plugs for different sizes may be able to be equipped with the same tapped hole, and therefore the sensor may be usable for all these sizes.

In an example embodiment, in the case of the screw plug, for at least two sizes, the tapped hole for the connection to the sensor and the external form, e.g., the external hexagon, may be implemented uniformly, and for these sizes, the external thread, the end stop and/or the sealing ring may be implemented differently. For different sizes, the same tool may be used for tightening or loosening the screw plug, the same tool may be used for tightening or loosening the sensor, and nevertheless, different sizes of the devices, e.g., different wall thicknesses of the housing of the gear unit or of the geared motor, may be usable for the same sensor.

Further features and aspects are set forth below.

REFERENCE NUMERAL LIST

1 screw plug
2 second tapped hole with sinking
3 first sealing surface
4 sealing ring
5 end stop
6 external thread
7 second sealing surface
8 first tapped hole with internal thread, straight through
9 housing 31 external thread
32 cone
33 external hexagon

DETAILED DESCRIPTION

Figure 1:
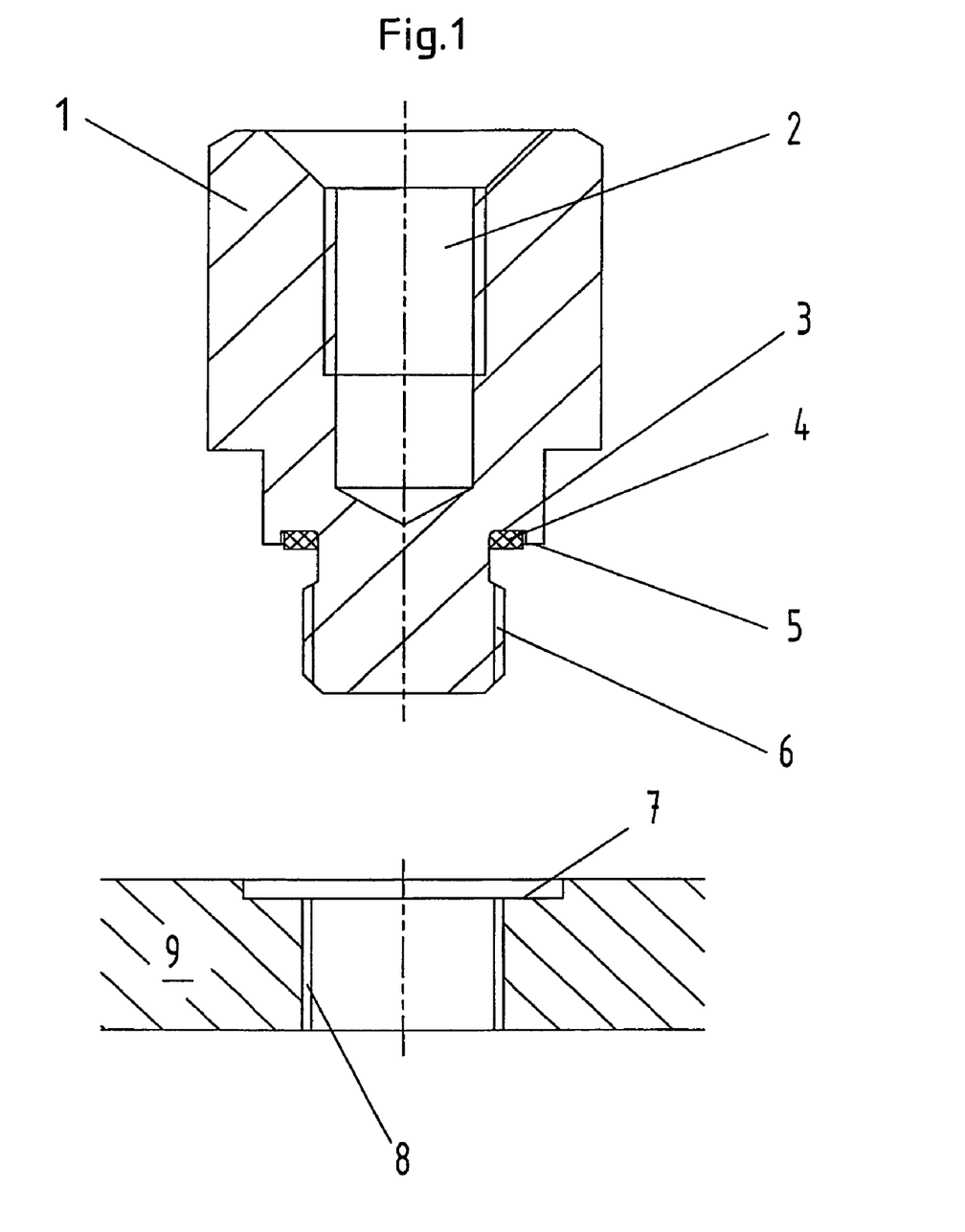
FIG. 1 is a cross-sectional view an example embodiment of a device according to the present invention in an uninstalled state.

In FIG. 1, a second tapped hole 2 is introduced with sinking into screw plug 1 for the connection to sensor (31, 32, 33). Screw plug 1 is screwed with its external thread 6 into a first tapped hole 8, which passes through the housing and has an internal thread, until end stop 5 abuts. After applying a suitable tightening torque, the sound is transmitted very well via end stop 5 and second sealing surface 7. At the same time, the machining—actually provided because of the seal tightness—of the sealing surfaces, e.g., second sealing surface 7 and the corresponding opposite surface of end stop 5, also has a positive effect on the transmission of structure-borne noise, because the coupling is improved from the standpoint of acoustical engineering. Sound is additionally transmitted via first tapped hole 8. In addition, the sealing ring is compressed when applying the tightening torque. Therefore, screw plug 1 is joined to housing 9 via first sealing surface 3 and second sealing surface 7 in a manner forming a seal, e.g., against the escape of lubricant.

Thus two paths are available for the propagation of sound from the gear unit toward the sensor, namely, via the screw thread on one hand, and via the end stop on the other hand. The sound transmission may therefore be improved, as well as the signal-to-noise ratio.

Thus, only second sealing surface 7 may need to be machined with sufficiently high surface quality on housing 9.

Figure 3:
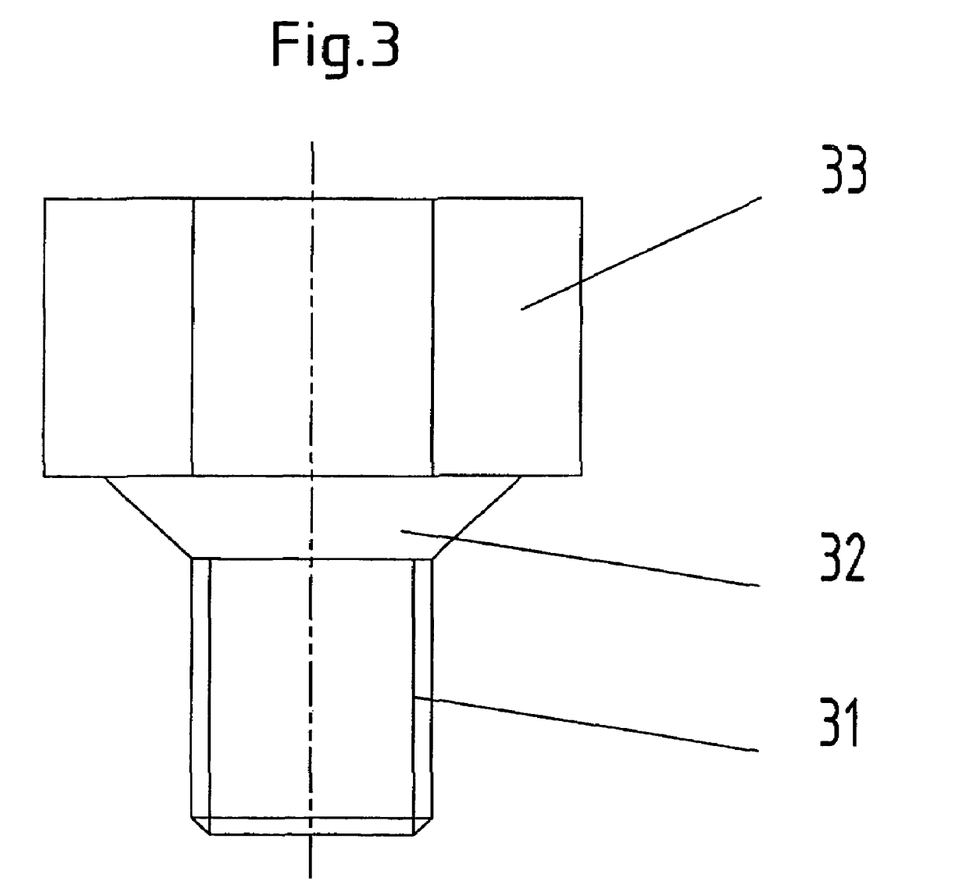
FIG. 3 is a side view of an example embodiment of a device according to the present invention.

FIG. 3 shows the sensor schematically. The sensor has an external thread 31 for screwing into second tapped hole 2 with sinking, cone 32 or the cone section being formed to correspond with the sinking in the case of second tapped hole 2. In addition, the sensor has an external hexagon 33 for the form-locking, releasable connection with a tool for the tightening, such as, for example, a hexagon.

Figure 2:
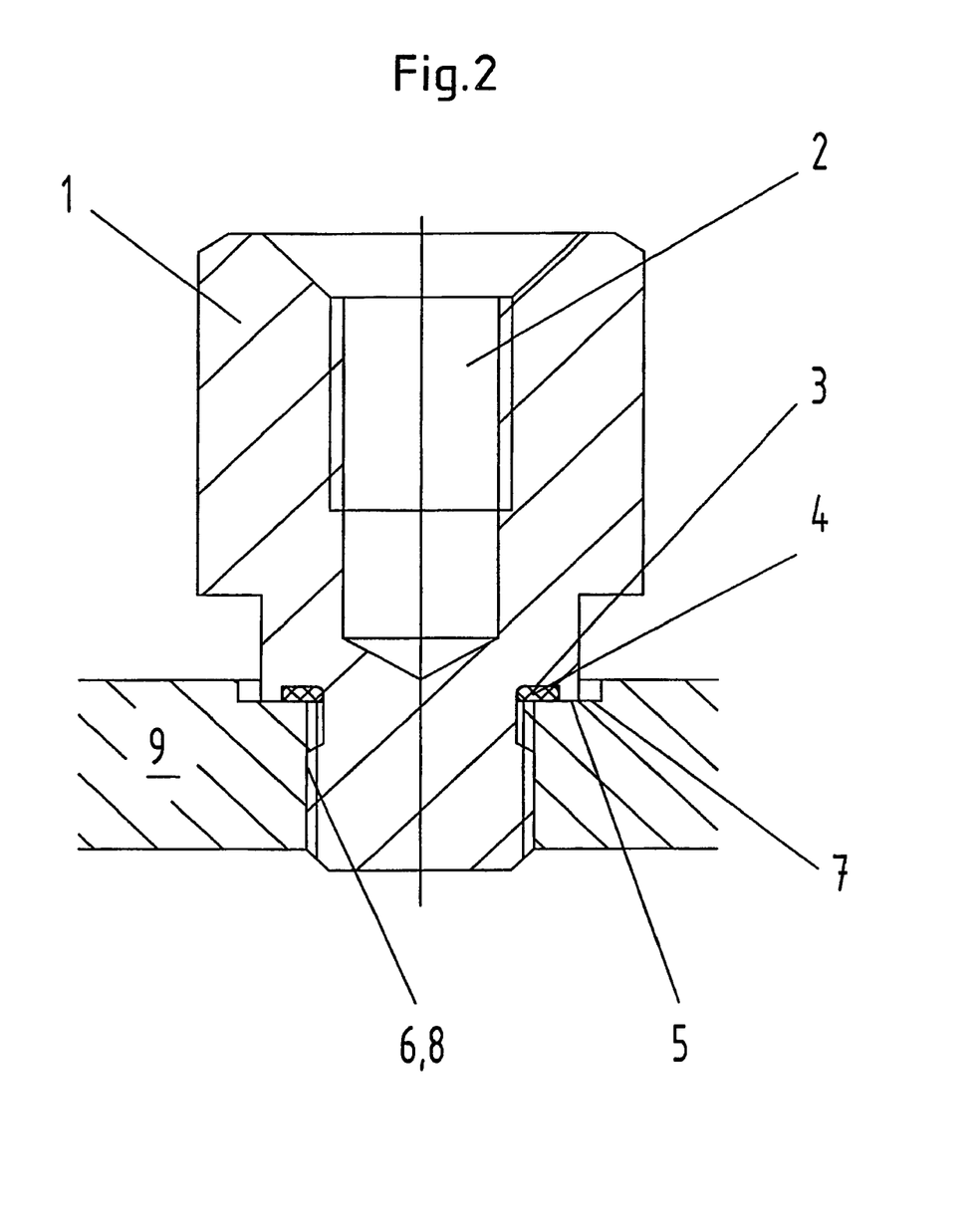
FIG. 2 is a cross-sectional view of the device illustrated in FIG. 1 in an installed state.

FIG. 2 shows the screw plug in the installed state. Sealing ring 4 is squashed, and end stop 5 is arranged directly, under sufficiently great action of force, on second sealing surface 7, which may contribute considerably to the sound transmission.

Figure 4:
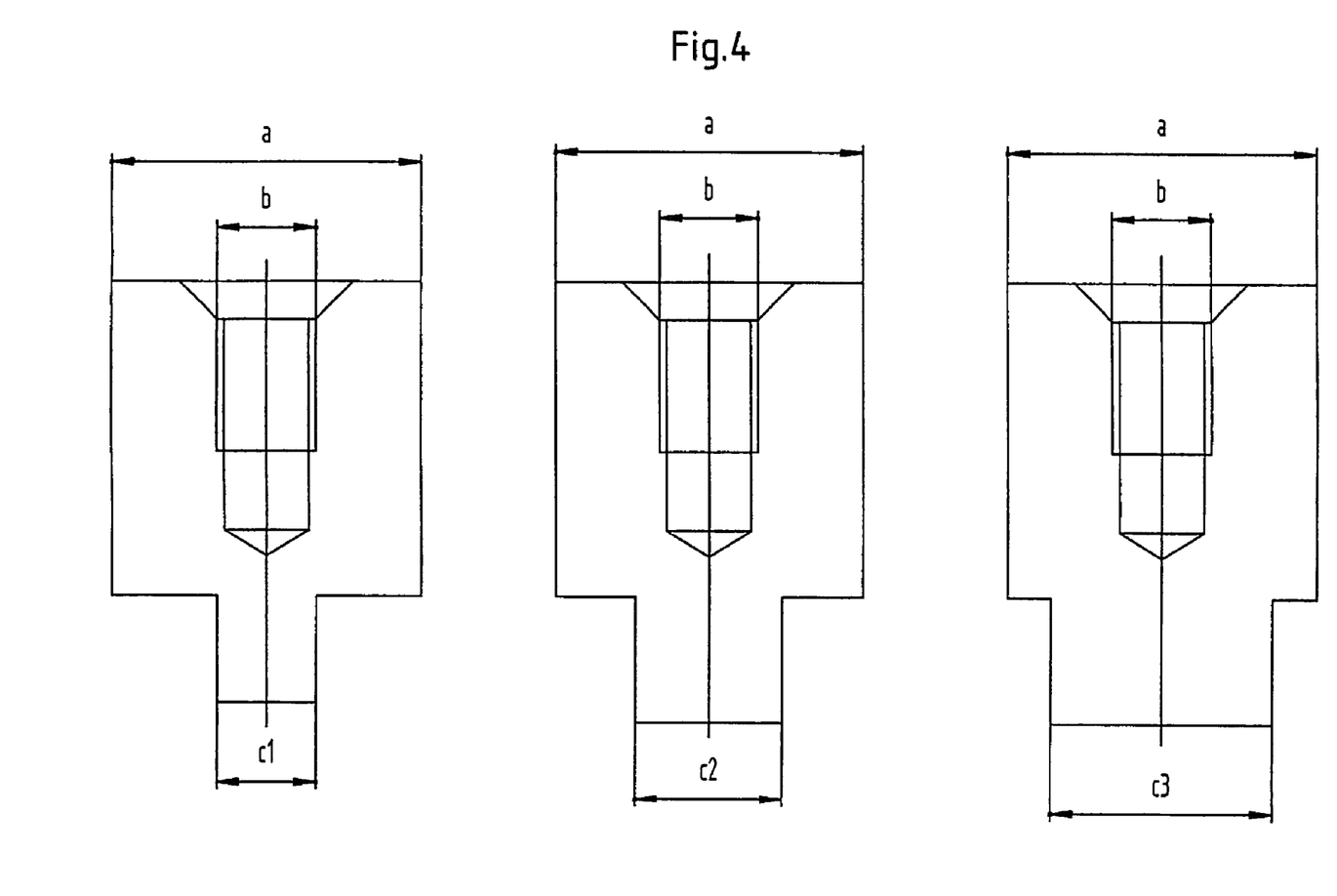
FIG. 4 illustrates an example embodiment of a production series of the present invention.

The production series of gear units may feature several sizes. Since the wall thicknesses of the associated housing are different, the screw plugs are also dimensioned accordingly. FIG. 4 shows three screw plugs matched to three sizes of the production series. On the housing side, they are designed differently with, e.g., different diameters $c_1$, $c_2$ and $c_3$. On the sensor side, however, they have the same design with, e.g., the same overall size a and the same diameter b of the tapped hole. In the first place, the external form is implemented as an identical external hexagon, and secondly, the second tapped hole with sinking is in each case also identical. Therefore, the same sensor may always be able to be connected. Thus, the production series may have great variance or variety, may satisfy customer wishes for gear units of different sizes with or without sensor, and may even require only one sensor for different sizes. The screw plug is, as it were, an adapter which permits the use of one sensor for several sizes. In addition, the screw plug without sensor is usable as a sealing element. Moreover, it is possible to replace the screw plug by a different screw plug which has no partial areas projecting from the housing and, for example, has an internal hexagon for the application of a tool.

An aspect of an example embodiment of screw plug 1 illustrated in FIG. 1 is also that end stop 5, because of its function of conducting sound, may be usable as a device for monitoring the connection of the screw plug to the housing. The sound conductivity increases rapidly while screwing the screw plug into the housing after the end stop has made contact with the sealing surfaces. Therefore, the sound detection of the sensor is able to detect whether the screw plug has been screwed in incorrectly, e.g., has not been screwed in completely.

What is claimed is:

1. A device, comprising:
   sensing means for sensing at least one of vibrations and acoustic vibrations at least in a subrange of a range between 0 Hz and 10 MHz; and
   at least one screw plug for screwing into a first tapped hole of a housing, the at least one screw plug including means for sealing a connection to the housing to form a seal, the at least one screw plug including a second tapped hole for releaseably connecting to the sensing means, the at least one screw plug including an end stop for conducting acoustical waves and arranged as a mechanical limit for screw-in of the screw plug.

2. A production series, comprising:
   a sensor configured as at least one of a vibration sensor and a sensor arranged to detect acoustic vibrations at least in a subrange of a range between 0 Hz and 10 MHz; and
   a plurality of devices, each device including at least one screw plug configured to be screwed into a first tapped hole of a housing, the at least one screw plug including a seal arrangement configured to seal a connection to the housing to form a seal, the at least one screw plug including a second tapped hole configured to releaseably connected to the sensor, the at least one screw plug including an end stop configured to conduct acoustical waves and arranged as a mechanical limit for screw-in of the screw plug, the production series including at least two sizes, each size including a different screw plug, the different screw plugs for the at least two sizes configured to connect to a same sensor.

3. The production series according to claim 2, wherein the sensor is releaseably connectable by an external thread to the second tapped hole.

4. The production series according to claim 2, wherein the second tapped hole and an external form of the screw plug are uniformly configured for the at least two sizes, at least one of an external thread, the end stop and the seal arrangement configured differently for the at least two sizes.

5. The production series according to claim 4, wherein the external form includes an external hexagon.

6. A device, comprising:
   a sensor configured as at least one of a vibration sensor and a sensor arranged to detect acoustic vibrations at least in a subrange of a range between 0 Hz and 10 MHz; and
   at least one screw plug configured to be screwed into a first tapped hole of a housing, the at least one screw plug including a seal arrangement configured to seal a connection to the housing to form a seal, the at least one screw plug including a second tapped hole releaseably connected to the sensor, the at least one screw plug including an end stop configured to conduct acoustical waves and arranged as a mechanical limit for screw-in of the screw plug.

7. The device according to claim 6, wherein the seal arrangement includes a seal ring.

8. The device according to claim 6, wherein the seal arrangement is configured to seal the connection to the housing against escape of oil.

9. The device according to claim 6, wherein the second tapped hole is releaseably connected to the sensor by a screw connection.

10. The device according to claim 6, wherein the seal arrangement is configured to be increasingly compressed during screw-in to a maximum value in accordance with the end stop.

11. The device according to claim 6, wherein the seal arrangement is positionable between two sealing surfaces, the sealing surfaces each having a direction of surface normal parallel to an axial direction of threads of the screw plug, a distance between the sealing surfaces reduceable by screw-in of the screw plug up to a value in accordance with the end stop.

12. The device according to claim 6, wherein the end stop is arranged on a larger diameter than the seal arrangement, the end stop arranged as a housing-part-forming protection for the seal arrangement in a screwed-in position of the screw plug.

13. The device according to claim 6, wherein the device is arranged as at least one of a gear unit and a geared motor.

14. The device according to claim 6, wherein the second tapped hole includes a countersink, the sensor including an external thread corresponding to the second tapped hole and a cone section corresponding to the countersink.

15. The device according to claim 6, wherein the seal arrangement is configured for impervious connection to the housing.

16. The device according to claim 6, wherein the screw plug is configured to contact a sealing surface of the housing, the sealing surface including a surface quality configured to produce an impervious connection between the screw plug and the housing by the seal arrangement.

17. The device according to claim 6, wherein the housing is arranged as a housing of a gear unit, the first tapped hole arranged straight through the housing and arranged to at least one of remove and pour out of lubricant.

18. The device according to claim 6, wherein the screw plug includes an external thread configured to screw into the first tapped hole.

19. The device according to claim 6, wherein the screw plug is arranged to seal a straight-through housing opening of a housing fillable with oil.

20. The device according to claim 6, wherein acoustical vibrations are transmittable via the first tapped hole, the second tapped hole and the end stop and in accordance with mutually contacting surfaces, a tightening torque of the sensor against the screw plug and a tightening torque of the screw plug against the housing with a sufficient signal-to-noise ratio for detection by the sensor.

21. The device according to claim 6, wherein the screw plug and the housing are formed of a metallic material.

22. The device according to claim 6, wherein the first tapped hole is arranged as a straight through tapped hole.

23. The device according to claim 22, wherein the screw plug arranged as an oil drain plug.

24. The device according to claim 6, wherein the screw plug is arranged to project from the housing in a screwed-in state with an external form protrusion, the screw plug releaseable and reconnectable with a tool releaseably connectable with the external form protrusion with form locking.

25. The device according to claim 24, wherein the external form protrusion includes an external hexagon.

26. The device according to claim 6, wherein the housing is arranged as a housing of a gear unit including a lubricant.

27. The device according to claim 26, wherein the lubricant includes oil.

\* \* \* \* \*

UNITED STATES PATENT AND TRADEMARK OFFICE
CERTIFICATE OF CORRECTION

PATENT NO. : 7,624,618 B2
APPLICATION NO. : 10/487688
DATED : December 1, 2009
INVENTOR(S) : Bader et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Twenty-sixth Day of October, 2010

David J. Kappos
*Director of the United States Patent and Trademark Office*